Oct. 10, 1933.                W. W. ODELL                1,930,442
                    PROCESS FOR MAKING COMBUSTIBLE GAS
                            Filed April 11, 1930
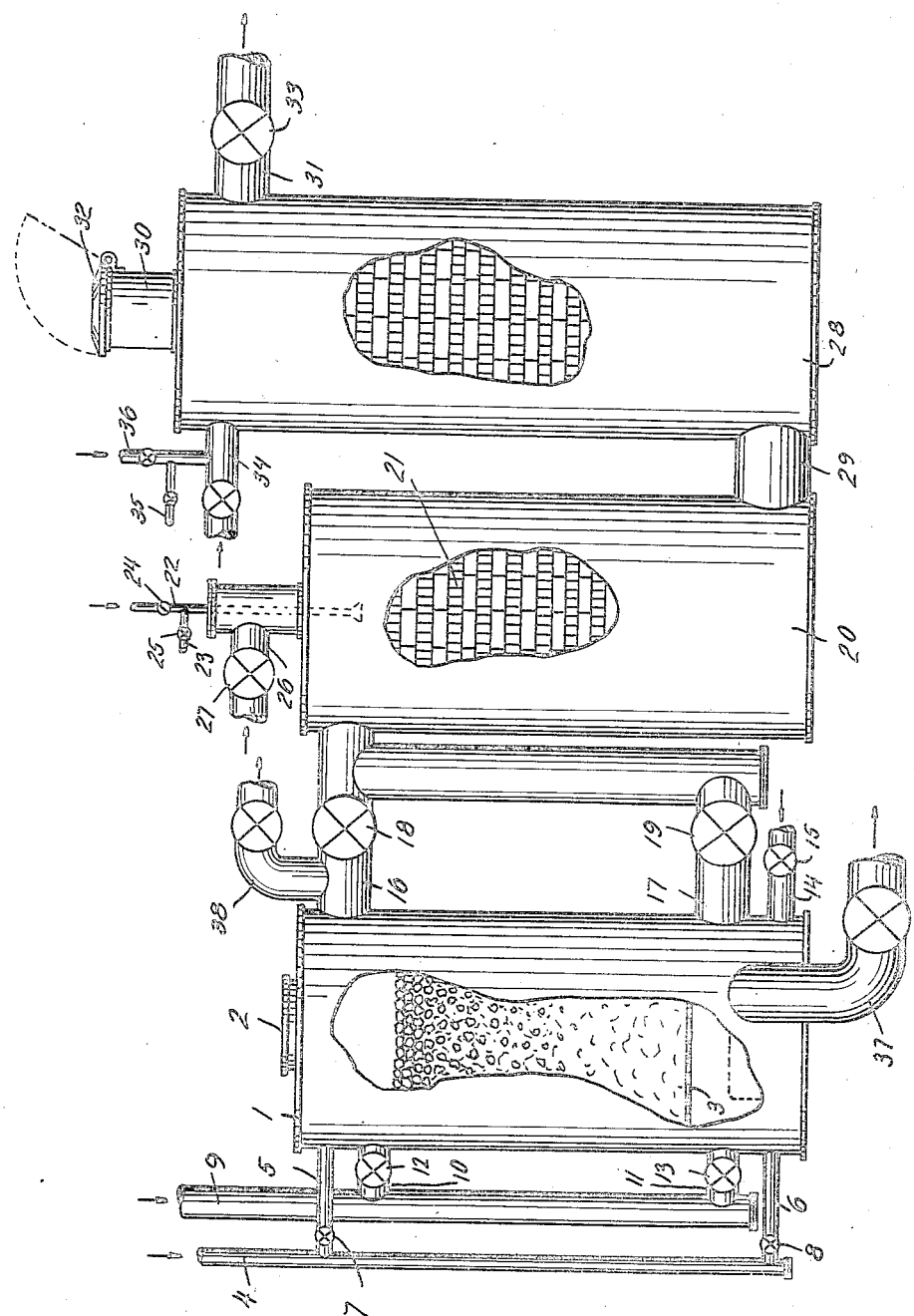
INVENTOR
William W. Odell
BY
ATTORNEYS Patented Oct. 10, 1933

1,930,442

UNITED STATES PATENT OFFICE 1,930,442

PROCESS FOR MAKING COMBUSTIBLE GAS

William W. Odell, New York, N. Y., assignor to Columbia Engineering & Management Corporation, New York, N. Y., a corporation of Ohio Application April 11, 1930. Serial No. 443,378

6 Claims. (Cl. 48—196)

This invention relates to a process for making combustible gas. A bed of fuel such as coal or coke is brought to incandescence by blowing with air and the incandescent bed is then blown with a mixture of steam and a hydrocarbon gas and the hydrocarbon gas is re-formed, and the fuel bed is also blown with steam alone. Both runs produce combustible gas. The invention also relates to a method of enriching "re-formed" gas. The process of this invention can be carried out in a water gas set and it can be controlled to produce a combustible gas having desired specific gravity and burning characteristics.

In carrying out my process I re-form a hydrocarbon gas by introducing it into an incandescent fuel bed in admixture with steam. I also use a hydrocarbon gas to enrich the gases in the carburetor. Among the hydrocarbon gases which I may employ are included natural gas, products obtained from natural gas such as natural gasoline, methane, butane, propane, pentane, etc., and finely atomized hydrocarbon liquids, such as petroleum or products obtained by refining petroleum, or mixtures of these. I prefer to employ hydrocarbons which have boiling points not higher than that of natural gasoline.

In considering this new process of manufacturing combustible gas and comparing this process with other processes reference will be made to the following table:

| | Equations | Theoretical specific gravity of the gas |
|---|---|---|
| 1 | $CH_4 + H_2O = CO + 3H_2$ | 0.294 |
| 2 | $C_4H_{10} + 4H_2O = 4CO + 9H_2$ | 0.345 |
| 3 | $C_nH_{2n+2} + nH_2O = nCO + (2n+1)H_2$ | Less than 0.368 |
| 4 | $C_2H_4 + 2H_2O = 2CO + 4H_2$ | 0.368 |
| 5 | $C_3H_6 + 3H_2O = 3CO + 6H_2$ | 0.368 |
| 6 | $C_nH_{2n} + nH_2O = nCO + 2nH_2$ | 0.368 |
| 7 | $C + H_2O = CO + H_2$ | 0.368 |
| 8 | $C + 2H_2O = CO_2 + 2H_2$ | 0.518 |
| 9 | $C_zH_y \begin{Bmatrix} \text{contacting a highly heated} \\ \text{surface, at equilibrium} \end{Bmatrix} = xC + \frac{y}{2}(H_2)$ | 0.55 |
| 10 | $xC_6H_{14} + yH_2O = C_6H_{14} + C_5H_{12} + C_4H_{10} + CO + C_3H_8 + C_2H_6 + CH_4 + C_5H_{10} + C_4H_8 + C_2H_4 + C_3H_6$ etc., in varying amounts according to the temperature. | |

In manufacturing the new combustible gas a water gas set comprising a generator and also preferably a carburetor and a superheater are employed. However, the process differs in very material respects from the ordinary water gas operation. In making water gas an incandescent fuel bed is blown with steam. Carbon monoxide and hydrogen are produced together with small quantities of carbon dioxide, etc. By reference to Equations 7 and 8 (above) it will be observed that hydrogen is produced on blowing the fuel bed with steam regardless of whether carbon monoxide or carbon dioxide is formed. Both carbon monoxide and carbon dioxide are formed in making water gas, and the molecular ratio, i. e. the ratios of the molecules of hydrogen to the molecules of carbon monoxide in the resulting gas is therefore greater than one, ordinarily being in the neighborhood of 1.1 or less. The density of water gas is ordinarily between .518 and .53. Carburetted water gas, i. e. water gas which has been enriched by the usual method of cracking gas oil by bringing the oil into contact with the hot water gas in the presence of highly heated refractory material has a higher gravity than uncarburetted water gas, generally in the neighborhood of about .60–.70.

Coal gas usually has a specific gravity of about .40 to .45 and commonly is the base gas in making city gas. Any gas to be a satisfactory substitute for coal gas in burners adjusted for coal gas must have a gravity approximating .40 to .45, otherwise it will be necessary to adjust the burners whenever the substitute gas is employed and to again adjust the burners when the use of the substitute gas is discontinued and the use of the original gas is resumed.

Water gas and carburetted water gas are too heavy to be employed satisfactorily as substitutes for coal gas. When propane, butane, pentane and other hydrocarbon gases are used either alone or in mixtures as an enricher for water gas the specific gravity of the enriched gas will be appreciably higher than that of coal gas. Natural gasoline has too high a specific gravity to be used directly by volatilization as an enricher.

In one step of the process of this invention I "re-form" such hydrocarbons as propane, butane, pentane, etc., and natural-gas gasoline and I produce a gas of lower specific gravity than the hydrocarbons. This may be carburetted or it may be blended directly with water gas in the proper proportions to produce a gas with a desired specific gravity, for example .40 and .45 which can be used as a substitute for coal gas or which can be blended with coal gas. The resulting gas is cleaner than coal gas or water gas and is very desirable as a combustible gas.

By reference to Equations 1–3 above, it will be observed that when steam is caused to react with methane and the methane and steam break down into carbon monoxide and hydrogen, the resulting gas has a theoretical gravity somewhat less than .30, and further, that the re-formed gases produced from the other saturated hydrocarbons by a similar reaction all have a gravity less than .368. If an olefin is completely broken down with steam a mixture of carbon monoxide and hydrogen is obtained which has a theoretical gravity of .368. This is indicated by Equations 4, 5 and 6. Mixtures of hydrogen and carbon monoxide produced in this way have a gravity less than that of water gas, the gravity of which is ordinarily between .51 and .53. When, therefore, steam and a paraffin hydrocarbon such as a saturated hydrocarbon or an olefin or a mixture of these, e. g. natural gasoline, is passed thru a bed of incandescent fuel together with steam at a temperature sufficient to break down the hydrocarbon into carbon monoxide and hydrogen and there is sufficient steam present to form water gas with the fuel, the resulting gas mixture will have a gravity less than that of ordinary water gas. When this reformed gas is enriched to any specified B. t. u. the enriched gas has a lower specific gravity than ordinary water gas enriched with the same enricher. I take advantage of this fact in my process. I re-form hydrocarbon gas and obtain a gas with a gravity less than that of ordinary water gas. This re-formed gas is blended with water gas to produce a gas of desired gravity or it can be enriched and the enriched gas is then blended with water gas.

The process of this invention may be carried out in the generator of a water-gas set or, when an enriched gas is produced, in a carburetted-water-gas set. I prefer to employ a generator with inlets for steam and gas above the fuel bed and an inlet for steam and, where desired, an inlet for gas also below the fuel bed and with outlets both above and below the fuel bed for the gas produced.

The generator is filled with coal or coke which is ignited and blasted with air to bring it to incandescence and to a suitable gas-making temperature. The air blast is then discontinued and a mixture of steam and hydrocarbon gas in predetermined proportions and at a predetermined rate are introduced into the fuel bed from above or below. The hydrocarbon gas which I sometimes prefer to employ is natural gasoline. The hydrocarbons react with the steam to produce hydrogen and carbon monoxide and the steam reacts with the fuel to produce hydrogen and carbon monoxide. The resultant gas which is composed essentially of hydrogen and carbon monoxide is removed from beneath or from above the fuel bed, depending upon the point at which the steam and hydrocarbon gas are introduced. After the temperature of the fuel bed is reduced somewhat the supply of hydrocarbon gas is discontinued. The introduction of steam is continued, however, and this produces water gas. The use of superheated steam in both the steam run and the gas-steam run is preferred.

The length of the gas-steam run and the steam run are so proportioned that a gas of the desired composition is produced. The temperature to which the fuel bed is heated and the length of the gas-steam run are so regulated that during this run the temperature of the fuel bed is such that the hydrocarbons are readily decomposed. Furthermore, these factors are so regulated that the combined gas-steam and steam runs lower the temperature of the fuel bed to a point such that the consumption of fuel for the whole run is kept on an economical basis.

The runs may be alternately up and down or split runs, i. e. part up and part down. The gas-steam run may be entirely up or down and the steam run down or up, respectively, or the runs may be split on a basis other than lengths of the steam and gas-steam runs.

The gas-steam run ordinarily preceeds the steam run, i. e. it immediately follows the air blast since at this time the temperature of the fuel bed is highest. Further, it is desirable to commence the introduction of the hydrocarbon gas as soon after the air blast as possible so that it can be discontinued before the temperature drops to a point where an undesirable amount of carbon black is liberated or where hydrocarbon gas passed fails to react in the generator. The gravity of the gas produced during the gas-steam run increases progressively during the run from about 0.30. Usually it is preferable to discontinue the gas-steam run and go on to the steam run before the gravity of the gas resulting from the gas-steam run reaches 0.50. The maximum gravity possible is the gravity of the gas produced when the fuel bed has cooled to the point where the hydrocarbons cease to react with the steam.

The filtering action of the fuel bed with respect to the removal of entrained carbon is greater during down-runs than during up-runs. This is probably due to the greater density of the fuel mass during the down-runs. Because of the greater filtering action during the down-runs it is advantageous to make the gas-steam run a down-run and the steam run an uprun, at least so far as practical.

The enriching operation where the gas is enriched may be carried out in any approved manner, but according to a preferred method the enriching operation is limited to a treatment of the gas produced during the gas-steam run, and a hydrocarbon, preferably natural-gas gasoline is used as the enricher. There are several reasons why it is desirable to enrich the gases during the gas-steam run. The enricher is advantageously introduced into the carburetor along with a predetermined amount of steam and preferably when the carburetor is at maximum temperature. The period of maximum temperature in the carburetor follows immediately after the air-blasting period, which, according to the preferred method of operation described above coincides with the gas-steam run.

The molecular ratio of hydrogen to carbon monoxide in the gases produced during the gas-steam run is greater than that of these gases in ordinary water gas, and it may be as high as 1.5 or 2. It is greatest during the early portion of the gas-steam run. The presence of such a high percentage of hydrogen is conducive to the cracking of hydrocarbons. When enricher is added during the gas-steam run, when the temperature is high and the molecular ratio of hydrogen to carbon monoxide is greater than 1.1 or preferably greater than 1.5, carbon resulting from enriching is kept at a minimum.

Hydrocarbons having a greater molecular weight than methane do not require as high a temperature for decomposition as methane, other conditions being kept constant. The temperature in the carburetor is advantageously so regulated that a large percent of the methane introduced with the enricher and the methane formed by the cracking of the enricher escape from the carburetor without being decomposed and the addition of enricher is discontinued before any considerable percentage of the hydrocarbons higher than methane present in the enricher escapes from the the carburetor without being decomposed. At times it may be necessary to store up more heat in the carburetor than that supplied by the usual air blow period and this may be done by lengthening the blow period. The temperature in the carburetor may then be so high that a considerable portion of the methane is decomposed in the early portion of the enriching stage.

The enriched gas under most favorable conditions contains a high percentage of hydrogen and also an appreciable amount of carbon monoxide and a considerable portion of the methane introduced with the enricher and the methane formed by the cracking of the enricher. The enriched gas which results when the operation is carried on economically, maintaining a heat balance with respect to the heat available and the heat utilized, has a calorific value of about 480–530 B. t. u. per cubic foot. This value is to be preferred to the much higher calorific value of about 600 B. t. u. per cubic foot which ordinary carburetted water gas has when the heat balance is carefully regulated.

Much less heat is required to carry out the reactions indicated in Equations 1–6 than is required for making ordinary water gas. Because less heat is required in making 1000 cubic feet of re-formed gas than in generating an equal volume of ordinary water gas, less air-blasting is required and therefore normally less heat is stored in the checker chambers during the air-blasting period.

Sufficient steam is introduced into the carburetor with the enricher to produce a gas composed chiefly of carbon monoxide, hydrogen and methane substantially free from entrained carbon. The quantity required will vary with the hydrocarbon used and can best be determined for mixed hydrocarbons by experiment. The temperature in the carburetor is ordinarily too low for any appreciable decomposition of methane into carbon monoxide and hydrogen by reaction with steam, according to Equation 1. By admitting the enricher to the carburetor only during the gas-steam run during which the gas contains more than 50% of hydrogen, a large amount of methane is formed during the enriching stage and the percentage of higher hydrocarbons in the finished gas is small due to the decomposition of these hydrocarbons by the action of the steam at the temperature maintained in the carburetor.

Although I do not wish to be limited by any theory, I explain the formation of methane in the carburetor not only as a direct result of cracking but also by the reaction of hydrogen on compounds or radicals such as $CH_3$, $CH_2$, etc., which result from the breaking down of higher hydrocarbons by contact with the heated refractory material in the carburetor. These compounds or radicals have only fugitive existence and combine with the hydrogen to form methane. Higher hydrocarbons which are formed by interaction of these compounds or radicals with themselves or with hydrogen, I believe, are further decomposed in the carburetor until the conversion to methane is substantially complete. This substantially complete decomposition of higher hydrocarbons with production of methane takes place only over the period of time when the checker-work is maintained at a temperature sufficiently high, and yet not high enough to effect decomposition of the methane.

By my enriching process I obtain higher gasification efficiencies than those ordinarily obtained in the carburetion of ordinary water gas using gas oil as the carbureting material. I get efficiencies of 75 percent to 85 percent or more. Using natural gasoline as enricher gasification efficiencies as high as 85 percent and more are readily obtained and with natural gas efficiencies approaching 100 percent are obtained.

The invention will be further described in connection with the accompanying drawing which is a front elevation with parts broken away, of a gas generator set, but it is intended and is to be understood that it is not limited thereto:

The gas generator 1 is provided with an opening 2 thru which the generator is charged with fuel such as coal or coke or the like. The grates are indicated at 3. The steam main 4 is connected with the generator by branches 5 and 6 in which are the valves 7 and 8. The hydrocarbon gas is supplied to the generator thru the pipe 9 which is connected with the generator thru the branches 10 and 11. Valves 12 and 13 are provided in these branches. Air for blasting the fuel bed is blown into the generator thru the pipe 14 in which is the valve 15. The generator is equipped with gas outlets 16 and 17 above and below the fuel bed, respectively, and there are valves 18 and 19 in these gas outlets to regulate the flow of the gas therethrough.

A carburetor 20 filled with checker-work 21 is shown. The carburetor is equipped with a pipe 22 and a pipe 23 for the introduction of steam and enricher, respectively. These pipes are provided with valves 24 and 25. A pipe 26 with a valve 27 therein is also provided for the introduction of secondary air into the carburetor. The first carburetor of an ordinary water gas set is generally connected with a superheater which is here shown at 28. The pipe 29 connects the carburetor with the superheater. The opening 30 is an exhaust for the gases during the air-blasting of the fuel bed. The outlet 31 conducts the combustible gas made by the process to storage, etc. The exit 30 is equipped with a valve 32 and the outlet 31 is equipped with a valve 33.

According to a preferred method of operation, valves 18 and 32 are opened and valves 19 and 33 are closed and air is blown thru the pipe 14 and up thru the fuel bed in the generator 1 until the fuel bed is brought to incandescence and to the temperature required for the gas-steam run. The hot blast gases pass thru the pipe 16 and down over the checker-work of refractory material in the carburetor 20 and up thru the checker-work in the superheater 28. Secondary air is admitted thru the pipe 26 which causes secondary combustion in the carburetor 20 and the checker-work 21 is heated to an intense heat. When the fuel bed has been raised to the desired temperature, the valves 15, 18, 27 and 32 are closed and valves 33 and 19 are opened. Where desirable, means is provided for blasting the fuel bed by a down-run air blast as well as an up-run air blast. Automatic means for opening and closing the valves between the various runs may be provided.

When the fuel bed has been air-blasted to the desired temperature and the valves are reset, steam is introduced above the fuel bed thru the pipe 5 and natural gasoline or other chosen hydrocarbon fluid is introduced above the fuel bed thru the pipe 10. The mixture of steam and hydrocarbon gas is introduced into the heated fuel bed from above. The hydrocarbons are re-formed to gas containing a high percent of hydrogen and carbon monoxide. This gas passes thru the outlet 17 into the carburetor 20. The re-forming of the gas with production of hydrogen and carbon monoxide cools the fuel in the generator. Before the temperature is reached at which the hydrocarbon gas would not be substantially completely re-formed into hydrogen and carbon monoxide the valves 12 and 7 are closed and the valve 8 is opened. The valve 19 is closed and the valve 18 is opened. Steam is then passed up thru the fuel bed and water gas is formed. The water gas follows the gas from the gas-steam run to the carburetor and then to the superheater and out thru the outlet 31. The action of the steam on the fuel bed produces water gas and the temperature of the fuel bed is lowered still further. The manufacture of water gas is then discontinued by closing the valve 8. The valve 33 is closed and the valve 32 is opened and the fuel bed is again blasted with air with the introduction of secondary air thru the pipe 26 and the cycle of operations is repeated.

During the gas-steam run steam and natural gasoline or its equivalent are introduced thru the pipes 22 and 23 into the carburetor. The hydrocarbons higher than methane on coming in contact with the highly heated checker-work in the carburetor in the atmosphere of steam and the gas from the gas-steam run which contains a high percentage of hydrogen, decompose and methane is produced. The resulting enriched gas has a high content of hydrogen and contains a considerable amount of methane and carbon monoxide.

The gas produced is relatively free from entrained particles of carbon and entrained particles of tar or pitch. It is a cleaner gas than ordinary carburetted water gas. By regulating the proportion of steam and hydrocarbon gas introduced into the generator and varying the amount of enricher introduced into the carburetor, gases of various gravity and B. t. u. content can be produced. A gas with a gravity between .40 and .45 can readily be produced and this can satisfactorily be substituted for coal gas or mixed therewith.

The superheater is provided with an air connection 34 and hydrocarbon and steam connections 35 and 36 so that gas may be made by a back-run where this is desirable. The steam and gas are then heated as they pass over the hot checker-work before they are introduced into the hot fuel bed. The gas produced will be drawn off thru the take-off 38 or 37 depending upon whether the back-run is an up-run or a down-run.

I use hydrocarbon gas herein to include natural gas, products obtained from natural gas such as natural gasoline, methane, butane, propane, pentane, etc., and finely atomized hydrocarbon liquids such as petroleum or petroleum products obtained by refining petroleum, or mixtures of these. In the claims volatile hydrocarbon liquid is used to include natural gasoline, ethane, propane, butane, pentane, their isomers, homologues and mixtures of them.

This application is in part a continuation of my co-pending application Serial No. 172,736, filed March 4, 1927, now Patent No. 1,762,100.

I claim:

1. In the process of making combustible gas which gas is substantially free from suspended carbon resulting from hydrocarbon decomposition, the steps which comprise introducing a mixture of steam and a hydrocarbon gas comprising chiefly propane and butane into a highly heated fuel bed thereby producing a gas comprising essentially hydrogen and carbon monoxide in which the ratio of hydrogen to carbon monoxide is substantially from two to one to three to one and enriching the resulting gas by at least partially reforming therein in a chamber containing refractory material hydrocarbons which are liquid at normal temperatures and pressures.

2. The method of making combustible gas which is substantially free from suspended carbon resulting from hydrocarbon decomposition which comprises blasting an ignited fuel bed with air to bring it to incandescence, introducing a mixture of steam and natural gasoline into the incandescent fuel bed from above to reform it and to produce a gas the major portion of which is hydrogen and carbon monoxide in which the ratio of hydrogen to carbon monoxide is substantially from two to one to three to one, and then introducing steam only into the fuel bed while said fuel bed is still sufficiently hot to make water gas.

3. The method of making combustible gas which gas is substantially free from suspended carbon resulting from hydrocarbon decomposition which comprises blasting an ignited fuel bed with air to bring it to incandescence, introducing a mixture of steam and natural gasoline into the incandescent fuel bed from above whereby said natural gasoline is reformed and chemically combined with said steam to produce a gas the major portion of which is hydrogen and carbon monoxide in which the ratio of hydrogen to carbon monoxide is substantially from two to one to three to one, discontinuing the introduction of said steam and natural gasoline from above, introducing steam into said fuel bed from below while said fuel bed is still sufficiently hot to make water gas, and enriching the reformed gas by passing it together with steam and natural gasoline in contact with incandescent refractory material.

4. In the process of making combustible gas which gas is substantially free from suspended carbon resulting from hydrocarbon decomposition, the steps which comprise introducing a mixture of steam and hydrocarbon gas into a highly heated fuel bed thereby producing a gas the major portion of which is hydrogen and carbon monoxide and in which the ratio of hydrogen to carbon monoxide is substantially from two to one to three to one, enriching said gas by reforming in it and in the presence of a highly heated refractory material and steam gaseous hydrocarbons which are liquid at normal temperatures and pressures, said heated refractory material being maintained during the introduction of said enricher at a temperature below that at which a substantial amount of methane is decomposed in an atmosphere high in steam and hydrogen but above that at which hydrocarbons of greater molecular weight than methane decompose in an atmosphere containing appreciable amounts of steam and hydrogen.

5. The method of making combustible gas which gas is substantially free from suspended carbon resulting from hydrocarbon decomposition which comprises air blasting an ignited bed of fuel in a generator to incandescence, said fuel bed consisting of a mixture of coal and coke, conducting the gaseous products resulting from said air blasting through a primary and secondary heat exchanger, admitting air to the primary heat exchanger together with said gaseous products resulting from the air blasting for a period and in an amount sufficient to substantially complete the combustion of said gaseous products, storing heat in said primary and secondary heat exchangers and increasing their temperature to a degree sufficient to decompose gaseous hydrocarbons of greater molecular weight than methane, discontinuing the air blasting, then admitting steam and gaseous hydrocarbons upwardly through the fuel bed thereby generating a gas the major portion of which is hydrogen and carbon monoxide in which the ratio of hydrogen to carbon monoxide is substantially from two to one to three to one and simultaneously admitting hydrocarbons which are liquid at normal temperatures and pressures into the primary heat exchanger, continuing the introduction of steam and gaseous hydrocarbons into the fuel bed until the temperature of said fuel bed is reduced to below that at which methane is substantially completely decomposed, then introducing steam downwardly through the fuel bed with the production of water gas, and meanwhile continuing the introduction of the hydrocarbons which are liquid at normal temperatures into the primary heat exchanger until the temperature of said exchanger is reduced below the decomposition temperature of said hydrocarbons.

6. The method of making combustible gas which gas is substantially free from suspended carbon resulting from hydrocarbon decomposition which comprises blasting an ignited fuel bed with air to bring it to incandescence, discontinuing the air blasting, introducing steam and a mixture of hydrocarbon gases into the incandescent fuel bed from above under temperature conditions such that much of the methane contained in the hydrocarbon gases passes through the fuel bed without substantial alteration, whereby chiefly those gases having a higher molecular weight than the methane are reformed, said steam and hydrocarbons being mixed in proportion such that there is an excess of one molecule of steam for each molecule of hydrocarbon, the major portion of the generated gases being hydrogen and carbon monoxide with the ratio of hydrogen to carbon monoxide being substantially from two to one to three to one, withdrawing the gases thus generated, discontinuing the down run of steam and hydrocarbon gases and then making an up run through said fuel bed with steam to make water gas.

WILLIAM W. ODELL.